Oct. 11, 1966 E. H. SCHULTZ, JR 3,277,513
CASTER ARRANGEMENT
Filed Jan. 2, 1963
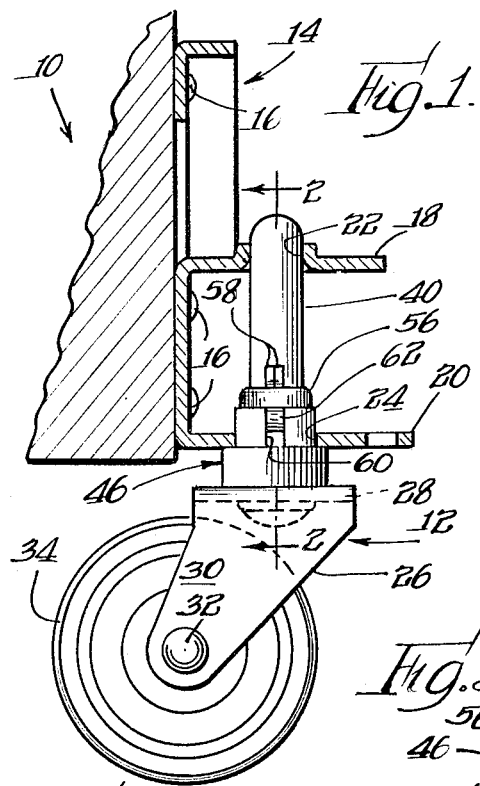
INVENTOR.
Edward H. Schultz, Jr.
BY Olson, Trexler, Wolters & Bushnell attys

United States Patent Office 3,277,513
Patented Oct. 11, 1966

3,277,513
CASTER ARRANGEMENT
Edward H. Schultz, Jr., Chicago, Ill., assignor to Nagel-Chase Manufacturing Company, Chicago, Ill., a corporation of Illinois
Filed Jan. 2, 1963, Ser. No. 249,082
7 Claims. (Cl. 16—31)

This invention relates generally to caster arrangements and especially to caster arrangements incorporating a body of bearing material in lieu of ball bearings.

Heretofore, when a caster arrangement was selected to employ a body of anti-friction material as the thrust bearing, it has been the common practice to direct the bearing into engagement with a radially outwardly extruded ring formed at the lower end of the pintle. Because the pintle is also journaled for rotation in the thrust bearing, occasions have frequently arisen in which the total frictional force acting between the pintle and the bearing has tended to lock these parts together, making action of the caster obstinate. User dissatisfaction has resulted.

Therefore, an important object of the present invention is to provide a caster arrangement of the solid bearing type in which the pintle is relieved of thrust loads.

A more general object of the invention is to provide a caster arrangement of the solid bearing type in which a facile swiveling action is assured.

A still more general object of the invention is to provide a new and improved caster arrangement.

An additional object of the invention is to provide a caster arrangement in which the thrust bearing is readily assemblable to the pintle and in which the thrust bearing is held in proper position on the pintle.

These and other objects and features of the invention will become more apparent from a consideration of the following description.

A caster arrangement in accord with the invention includes a rollable caster unit comprising a yoke having a horizontal platform and an upstanding pintle fixed to the platform, and a body of anti-friction material having a vertical bore defining a journal for the pintle, having a lower end portion bearingly engaging the platform, and having a horizontal, radially outwardly extending shoulder for receiving the weight of an object supported on the caster arrangement.

In order that the principle of the invention may be readily understood, various embodiments thereof, but to which the application is not to be restricted, are shown in the accompanying drawing wherein:

FIG. 1 is a side elevational view of a caster arrangement constructed according to the invention and shown supporting an object for rollable movement over an underlying surface;

FIG. 2 is an enlarged view taken through the section 2—2 of FIG. 1;

FIG. 3 is a further enlarged view taken along the line 3—3 of FIG. 2;

FIG. 4 is a view similar to the showing of FIG. 3 but illustrating a modified embodiment of the invention;

FIG. 5 is an end elevational view, partially in cross-section, of a further modified embodiment of the invention; and FIG. 6 is a view taken substantially along the line 6—6 of FIG. 5.

Referring now in detail to the drawing, specifically to FIGS. 1–3, a domestic washer or other similar object to be supported is indicated generally by the numeral 10; and a caster unit indicated generally by the numeral 12 is connected to the object to be supported by a mounting bracket 14. The bracket 14 is secured to the object 10 by rivets 16 or other suitable fasteners; and the bracket is fashioned with spaced opposed plates 18 and 20 which extend in a generally horiozntal attitude and which are perforated respectively with vertically aligned holes 22 and 24, holes 22 and 24 cooperating to couple the caster unit 12 to the bracket 14.

The caster unit 12 includes a yoke 26 having a horizontal platform 28 and spaced arms 30 depending from the platform to receive an axle 32 which is used in journaling a wheel 34 to the yoke. The platform 28 is provided with a raised central boss 36 which is perforated with a hole 38 for receiving a pintle 40. The pintle 40 is fashioned with a radially outwardly extruded ring portion 42 that is adapted to reside in contact with the upper surface of boss 36, the lower end of pintle 40 being upset to form a head 44. The head 44 engages the lower surface of boss 36 to secure the pintle to the yoke 26 in upstanding relationship.

In order to accommodate the vertical load from the object 10, a body of anti-friction material is situated about the pintle 40 between the platform 28 and the plate 20 to define a bearing 46. The thrust bearing 46 is provided with a vertical bore 48 that defines a journal for the cylindrical sidewall of pintle 40; and at its lower end portion, the thrust bearing 46 incorporates an integral skirt 50 spaced outwardly from the extruded ring 42 of the pintle. Since the bearing 46 is fabricated from an anti-friction material, such as for example sintered bronze powder impregnated with graphite, oil or some other suitable lubricant, the skirt 50 defines a bearing region 52 at its extremity. In addition, the skirt 50 terminates in a horizontal shoulder 54 in approximate vertical alignment with the bearing region 52, shoulder 54 being adapted to receive the vertical load from the object 10 through the plate 20, specifically at the edges of hole 24.

With specific reference to FIG. 3, the lower end of skirt 50 is seen to terminate in a beveled annular surface which defines the bearing region 52. A marginal portion of this beveled surface engages the top of platform 28 radially outwardly from the boss 36; and it is important to observe that near line-contact is obtained. A smooth, easy swiveling action results.

Turning to FIG. 2, a retainer cup 56 is seen situated overlying the thrust bearing 46 and beneath protrusions or ears 58 which are struck out of the metal forming the sidewall of pintle 40. As will be recognized, positioning of the retainer cup 56 between the bearing 46 and the ears 58 locates the thrust bearing longitudinally of the pintle 40. In order to fix the retainer cup 56 relative to the thrust bearing 46, the thrust bearing is provided with upwardly and outwardly opening slots 60. Cooperatively, the retainer cup 56 is fabricated from a spring material and is arranged to include depending fingers 62 which enter the slots 60 and grip the floors thereof. When it is desired to strengthen the pintle 40, a reinforcing element 64 will be inserted in the central bore thereof in interfering relationship. Element 64 may take the form of a solid rivet or a tubular ferrule as is desired.

While a particular embodiment of the invention has been thus far shown and described, it should be understood, of course, that the invention is not limited thereto since many modifications may be made. For example, modified embodiments of the invention are shown in FIGS. 4–6. Since these latter embodiments incorporate many parts similar to those found in the embodiment of FIGS. 1–3, like numerals have been used to designate like parts throughout the drawing, the suffix letter "*a*" being employed to distinguish those parts associated with the embodiment of FIG. 4 and the suffix letter "*b*" being employed to distinguish those parts associated with the embodiment of FIGS. 5 and 6.

The embodiment of FIG. 4 is particularly characterized by the fact that bearing region 52*a* engages the boss 36*a* with substantial surface contact therebetween, boss 36a being extended radially outwardly to underlie the skirt of thrust bearing 46a.

On the other hand, the embodiment of FIGS. 5 and 6 is characterized by the fabrication of thrust bearing 46b from a resilient resinous plastic material having a relatively low coefficient of friction. The polyamide resin commonly referred to as nylon has proved eminently useful in this regard. Moreover, the upper end portion of the thrust bearing 46b terminates in a radial enlargement 70 which is adapted to engage the ears 58b in abutting relationship, the enlargement 70 being inwardly relieved to space its inner marginal edge from the pintle 40b. This arrangement of the enlargement 70 facilitates resilient passage of the thrust bearing over the ears after the ears have been formed in place. Ease of passage of the thrust bearing over the ears is also facilitated by providing the thrust bearing with longitudinal slots 72, the slots 72 being disposed diametrically in the same manner as the ears 58 whereby to permit ready passage of the ears through the slotted portion of the thrust bearing upon alignment of the ears and slots. It should be realized that the nature of the material from which the bearing is fabricated permits the bearing to deform resiliently upon its passage over the ears. Thus, a worn bearing may be easily replaced without the need for flattening and reforming the ears.

The manner in which the present invention may be practiced and the purposes to which it may be put are evident from the foregoing descriptions.

The specific example herein shown and described is to be considered as being primarily illustrative. Various changes in structure will, no doubt, occur to those skilled in the art; and such changes are to be understood as forming a part of this invention insofar as they fall within the spirit and scope of the appended claims.

The invention is claimed as follows:

1. In a caster arrangement, the combination comprising: a rollable caster unit including means having a horizontal platform and an upstanding pintle fixed to said platform; and a body of anti-friction material having a vertical bore defining a journal for said pintle, having a lower end portion bearingly engaging said platform, and having a horizontal, radially outwardly extending shoulder overlying said end portion for receiving the weight of an object supported by said caster arrangement.

2. The combination according to claim 1 wherein the lower end portion of said body terminates in a flat annular surface engaging said platform.

3. The combination according to claim 1 wherein the lower end portion of said body terminates in a beveled annular surface, a marginal portion of said surface engaging said platform.

4. The combination according to claim 1 wherein said body has upwardly and outwardly opening slots, wherein said pintle has radially outwardly extending protrusions, and wherein said caster arrangement further comprises retainer means disposed between said body and said protrusions to position said body longitudinally of said pintle, said retainer means including resilient fingers entering said slots to fix said retainer means to said body for rotation therewith.

5. The combination according to claim 1 wherein said pintle has radially outwardly extending protrusions, wherein said anti-friction material is resiliently deformable, and wherein said body includes an upper end portion abuttingly engageable with said protrusions to position said body longitudinally of said pintle, said body being slotted longitudinally to facilitate radial expansion whereby to permit passage of said body over said protrusions.

6. In a caster arrangement, the combination comprising: a rollable caster unit including a yoke having a horizontal platform and an upstanding pintle with a cylindrical sidewall fixed to said platform; and a body of anti-friction material having a vertical bore defining a journal for the cylindrical sidewall of said pintle, having a lower end portion bearingly engaging said platform, and having a horizontal, radially outwardly extending shoulder overlying said end portion in vertical alignment therewith for receiving the weight of an object supported by said caster arrangement.

7. In a caster arrangement, the combination comprising: a rollable caster unit including a yoke having a horizontal platform and arms depending therefrom in spaced relationship, wheel means journaled for rotation between said arms, and an upstanding pintle fixed to said platform; and a body of anti-friction material having a vertical bore defining a journal for said pintle, having a lower end portion bearingly engaging said platform, and having a horizontal, radially outwardly extending shoulder overlying said end portion for receiving the weight of an object supported by said caster arrangement.

References Cited by the Examiner

UNITED STATES PATENTS

| | | | |
|---|---|---|---|
| 680,641 | 8/1901 | Clarke | 16—20 |
| 687,838 | 12/1901 | Keiper | 16—46 |
| 1,906,238 | 5/1933 | Ramsey et al. | 16—39 |
| 1,929,743 | 10/1933 | Jarvis et al. | 16—43 |
| 2,461,778 | 2/1949 | Schacht | 16—20 |

EDWARD C. ALLEN, *Primary Examiner.*

M. HENSON WOOD, JR., DONLEY J. STOCKING,
*Examiners.*

D. L. TROUTMAN, *Assistant Examiner.*